United States Patent
Hosabettu et al.

(10) Patent No.: US 10,025,656 B2
(45) Date of Patent: Jul. 17, 2018

(54) METHOD AND SYSTEM FOR FACILITATING OPERATION OF AN ELECTRONIC DEVICE

(71) Applicant: Wipro Limited, Bangalore (IN)

(72) Inventors: Raghavendra Hosabettu, Bangalore (IN); Anil Kumar Lenka, Bangalore (IN)

(73) Assignee: WIPRO LIMITED, Bangalore (IN)

( * ) Notice: Subject to any disclaimer, the term of this patent is extended or adjusted under 35 U.S.C. 154(b) by 116 days.

(21) Appl. No.: 15/153,781

(22) Filed: May 13, 2016

(65) Prior Publication Data
US 2017/0286201 A1 Oct. 5, 2017

(30) Foreign Application Priority Data
Mar. 30, 2016 (IN) .............................. 201641011192

(51) Int. Cl.
*G06F 11/00* (2006.01)
*G06F 11/07* (2006.01)
*G06F 17/30* (2006.01)

(52) U.S. Cl.
CPC ...... *G06F 11/079* (2013.01); *G06F 17/30312* (2013.01); *G06F 17/30958* (2013.01)

(58) Field of Classification Search
CPC .................................................. G06F 11/079
See application file for complete search history.

(56) References Cited

U.S. PATENT DOCUMENTS

| | | | |
|---|---|---|---|
| 6,915,282 B1 | 7/2005 | Conway et al. | |
| 7,062,508 B2 | 6/2006 | Andreev et al. | |
| 7,251,648 B2 * | 7/2007 | Chaudhuri | G06F 17/3053 707/749 |
| 8,494,987 B2 | 7/2013 | Katukuri et al. | |
| 8,612,377 B2 * | 12/2013 | Beg | G06F 11/079 706/52 |
| 9,164,822 B2 * | 10/2015 | Urmanov | G06F 11/0709 |
| 9,686,275 B2 * | 6/2017 | Chari | H04L 63/0861 |
| 2004/0204861 A1 | 10/2004 | Benner | |

(Continued)

OTHER PUBLICATIONS

David J. Hand et al., "Advances in intelligent data analysis", Third International Symposium IDA-99 Amsterdam, The Netherlands, Aug. 9-11, 1999, *Springer*, pp. 267-268.

*Primary Examiner* — Christopher S McCarthy
(74) *Attorney, Agent, or Firm* — Finnegan, Henderson, Farabow, Garrett & Dunner LLP (57) ABSTRACT

A method and a system are provided for facilitating operation of an electronic device. The method comprises receiving a semi-structured dataset comprising one or more entities, wherein the semi-structured dataset corresponds to at least an indication of an operation problem associated with an electronic device. The method comprises extracting one or more unique classes associated with one or more entities from the semi-structured dataset. The method comprises creating one or more n-grams representative of a relationship between the one or more entities and the one or more unique classes. The method comprises generating a hypothesis associated with the one or more entities based on a first set of entities from the one or more entities using one or more n-grams, wherein the generated hypothesis corresponds to an operation solution to solve the operation problem associated with the electronic device.

13 Claims, 4 Drawing Sheets

Application server 104

(56) References Cited

U.S. PATENT DOCUMENTS

| | | | |
|---|---|---|---|
| 2007/0156720 A1* | 7/2007 | Maren | G06K 9/6288 |
| 2008/0281660 A1* | 11/2008 | Sajja | G06Q 10/06 |
| | | | 705/7.26 |
| 2010/0318853 A1* | 12/2010 | Beg | G06F 11/079 |
| | | | 714/37 |
| 2010/0318855 A1* | 12/2010 | Beg | G06F 11/079 |
| | | | 714/39 |
| 2011/0153540 A1* | 6/2011 | Beg | G06F 11/0748 |
| | | | 706/52 |
| 2013/0235984 A1* | 9/2013 | Clifford | G07C 1/10 |
| | | | 379/88.01 |
| 2013/0254156 A1* | 9/2013 | Abbasi | G06F 17/30371 |
| | | | 707/602 |
| 2014/0172417 A1 | 6/2014 | Monk, II et al. | |
| 2015/0006567 A1* | 1/2015 | Finnerty | G06F 17/30463 |
| | | | 707/769 |
| 2016/0154805 A1* | 6/2016 | Finnerty | G06F 17/30463 |
| | | | 707/730 |
| 2016/0335260 A1* | 11/2016 | Convertino | G06F 17/3053 |
| 2017/0083386 A1* | 3/2017 | Wing | G06F 9/542 |
| 2017/0206256 A1* | 7/2017 | Tsirogiannis | G06F 17/30563 |
| 2017/0329653 A9* | 11/2017 | Li | G06F 9/542 |

\* cited by examiner

FIG. 1: System environment 100

FIG. 2: Application server 104

FIG. 3: A method 300 for facilitating operation of an electronic device

FIG. 4: Example Computer System

METHOD AND SYSTEM FOR FACILITATING OPERATION OF AN ELECTRONIC DEVICE

TECHNICAL FIELD

The presently disclosed embodiments are related, in general, to data processing. More particularly, the presently disclosed embodiments are related to method and system for facilitating operation of an electronic device.

BACKGROUND

Nowadays, due to the proliferation of various types of electronic devices of different vendors and configurations, and that the operations of these electronic devices are typically interrelated, finding a solution to an operation problem of a malfunctioning electronic device can become very challenging. As an illustrative example, when a user transmits, from a computer terminal, a printing task to use a network printer, but the printer fails to perform the task, there can be different reasons for the failure. For example, the printer may be malfunctioning, or may have been configured improperly. There can also be a network connectivity issue that prevents the printer from receiving the printing task. In addition, the computer terminal may also be configured improperly (e.g., using a wrong version of printer driver). Considering also that these equipment can be of different vendors and of different configurations, the solution space can become so large that it becomes impractical to use a brute-force approach (e.g., exhausting different combinations of possible solutions) to find a solution to an operation problem of an electronic device.

One approach to solve this problem is to leverage historical operation data of the electronic device, and of other devices that are related to that electronic device. As an illustrative example, a user may experience a certain operation problem with a first electronic device when operating it with a second electronic device. If, in the past, there are a certain number of users who have also operated the two electronic devices in the same way as this user, and experienced the same operation problem, it can be hypothesized that the operation problem with the first electronic device is caused by (or at least is connected to) the second electronic device.

Historical operation data of electronic devices can exist in different places and in different forms. For example, these data can be stored in enterprise service tickets, server logs, etc. These data typically come in two forms: structured data and unstructured data. Structured data can include a set of discrete data that are associated with specific fields, which give meaning to the set of discrete data. For example, a service ticket may include fields for inputting a type of electronic device (e.g., printer, laptop, etc.), an operation of the device (e.g., configuration, installation, etc.), etc. Unstructured data, on the other hand, can include data that are associated with a generic field (e.g., description of problem) and is not imparted with a pre-determined structure.

A conventional system typically accumulates these historical operation data (structured, semi-structured and unstructured), and apply regular association rules, as well as machine learning algorithms like classification, clustering, or regression methods, to look for relationship between operation data of different devices. Based on the relationship, the system may then determine a hypothesis for the cause of an operation problem, as well as the solution based on the hypothesis.

The inventors here have recognized several technical problems with such conventional systems. First, as discussed before, historical data can come in a structured form, a semi-structured form, and an unstructured form. While data in structured form may carry a certain meaning (imparted by the structured field a piece of data is associated with), data in the semi-structured form and the unstructured form can include many hidden information that is difficult to be extracted using regular association rules and machine learning algorithms. As an illustrative example, a convention system may not understand the meaning of a text description of "printer not working, cannot log into TC-300," nor can it classify and cluster different segments of the text, without the text being imparted with a structure that defines the meaning of each portion of the text.

Second, while natural language processing may provide some insight into how a text description can be interpreted, it becomes difficult to apply such processing to the extent that it generates a meaning for the whole text description, when there is huge volume of semi-structured and unstructured historical data and of different formats.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to embodiments illustrated herein, there may be provided a method for facilitating operation of an electronic device. The method may be executed by one or more processors of an application server. The method may receive a semi-structured dataset comprising one or more entities, wherein the semi-structured dataset corresponds to at least an indication of an operation problem associated with the electronic device. The method may extract one or more unique classes associated with one or more entities from the semi-structured dataset. The method may create one or more n-grams representative of a relationship between the one or more entities and the one or more unique classes. The method may determine a frequency of each of the one or more entities in the one or more n-grams, wherein a weight is assigned to each of the one or more unique classes. The method may generate a hypothesis associated with the one or more entities based on a first set of entities from the one or more entities using the one or more n-grams, wherein the frequency associated with the first set of entities is greater than a pre-defined threshold, wherein the generated hypothesis corresponds to an operation solution to solve the operation problem associated with the electronic device.

According to embodiments illustrated herein, there may be provided a system that comprises of an application server configured to facilitate operation of an electronic device. The application server may further comprise of one or more processors configured to receive a semi-structured dataset comprising one or more entities, wherein the semi-structured dataset corresponds to at least an indication of an operation problem associated with the electronic device. The one or more processors may be configured to extract one or more unique classes associated with one or more entities from the semi-structured dataset. The one or more processors may be configured to create one or more n-grams representative of a relationship between the one or more entities and the one or more unique classes. The one or more processors may be configured to determine a frequency of each of the one or more entities in the one or more n-grams, wherein a weight is assigned to the one or more unique classes. The one or more processors may be configured to generate a hypothesis associated with the one or more entities based on a first set of entities from the one or more entities using the one or more n-grams, wherein the frequency associated with the first set of entities is greater than a pre-defined threshold, wherein the generated hypothesis corresponds to an operation solution to solve the operation problem associated with the electronic device.

According to embodiments illustrated herein, a non-transitory computer-readable storage medium having stored thereon, a set of computer-executable instructions for causing a computer comprising one or more processors to perform steps of receiving a semi-structured dataset comprising one or more entities, wherein the semi structured dataset corresponds to at least an indication of an operation problem associated with the electronic device. The one or more processors may extract one or more unique classes associated with one or more entities from the semi-structured dataset. The one or more processors may create one or more n-grams representative of a relationship between the one or more entities and the one or more unique classes. The one or more processors may determine a frequency of each of the one or more entities in the one or more n-grams, wherein a weight is assigned to the one or more unique classes. The one or more processors may generate a hypothesis associated with the one or more entities based on a first set of entities from the one or more entities using the one or more n-grams, wherein the frequency associated with the first set of entities is greater than a pre-defined threshold, wherein the generated hypothesis corresponds to an operation solution to solve the operation problem associated with the electronic device.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Further, the elements may not be drawn to scale.

Various embodiments will hereinafter be described in accordance with the appended drawings, which are provided to illustrate and not to limit the scope in any manner, wherein similar designations denote similar elements, and in which.

DETAILED DESCRIPTION

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment" "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Figure 1:
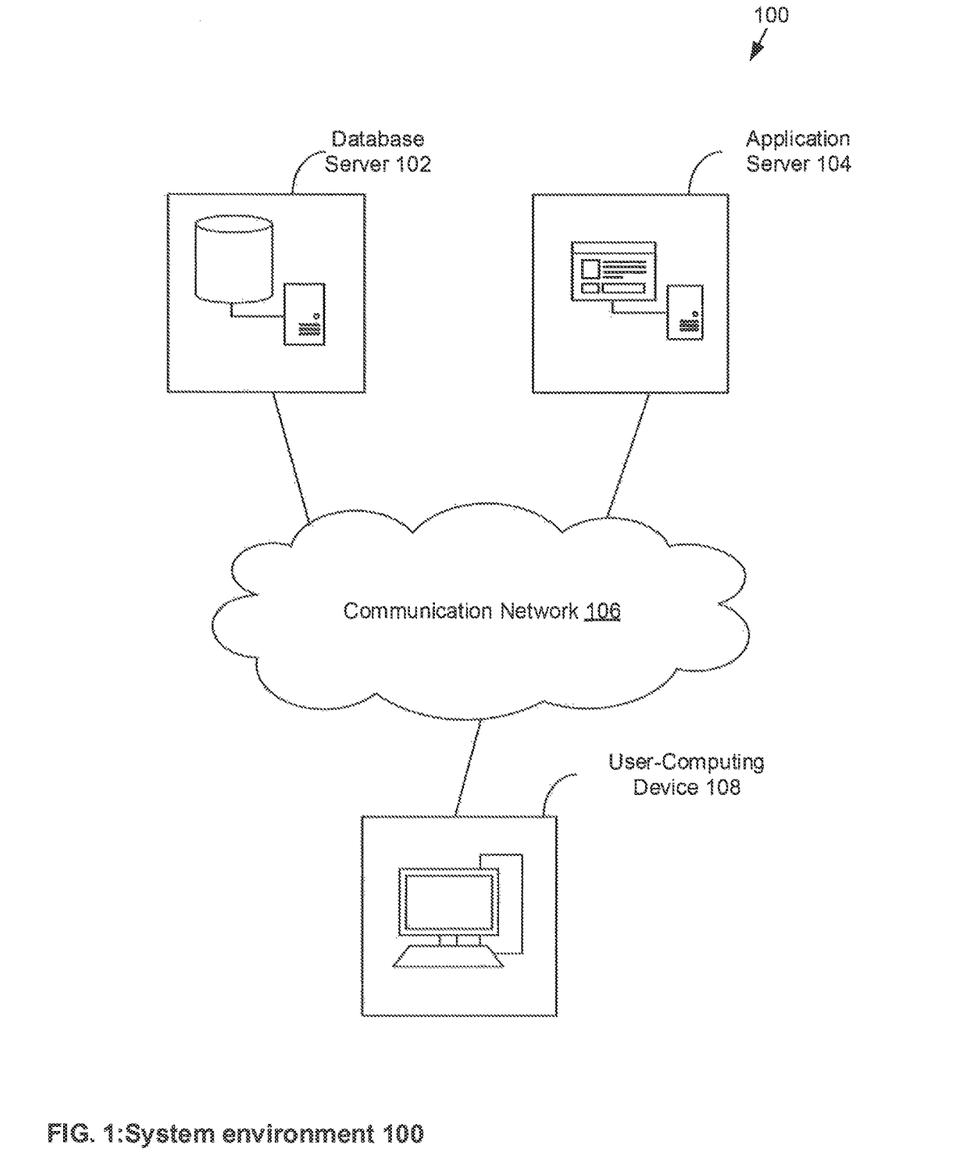
FIG. 1 is a block diagram that illustrates a system environment in which various embodiments of the method and the system may be implemented, in accordance with at least one embodiment.

FIG. 1 is a block diagram that illustrates a system environment 100 in which various embodiments of the method and the system may be implemented, in accordance with at least one embodiment. The system environment 100 may include a database server 102, an application server 104, a communication network 106, and a user-computing device 108. The database server 102, the application server 104, and the user-computing device 108 may be communicatively coupled with each other via the communication network 106. In an embodiment, the application server 104 may communicate with the database server 102 using one or more protocols such as but not limited to. Open Database Connectivity (ODBC) protocol and Java Database Connectivity (JDBC) protocol. In an embodiment, the user-computing device 108 may communicate with the application server 104, via the communication network 106.

In an embodiment, the database server 102 may refer to a computing device that may be configured to store a semi-structured dataset comprising one or more entities. In an embodiment, the semi-structured dataset corresponds to at least an indication of an operation problem associated with the electronic device. In an embodiment, the database server 102 may include a special purpose operating system specifically configured to perform one or more database operations on the semi-structured dataset. Examples of database operations may include, but are not limited to, Select, Insert, Update, and Delete. In an embodiment, the database server 102 may include hardware and/or software that may be configured to perform one or more predetermined operations. In an embodiment, the database server 102 may be realized through various technologies such as, but not limited to, Microsoft® SQL Server, Oracle®, IBM DB2®, Microsoft Access®, PostgreSQL®, MySQL® and SQLite®, and the like.

In an embodiment, the database server 102 may be configured to retrieve one or more operation problems associated with one or more electronic devices from at least one of an enterprise service ticketing system, one or more ticketing system logs, and the like. For example, the one or more problems may be retrieved from a ticket filed by a user about an operation problem h an electronic device, a real-time monitoring of an operation of an electronic device (e.g., a volume of data traffic through a WiFi hotspot, logging in of a terminal, printing/scanning tasks transmitted over the communication network, and the like.). The database server 102 may be configured to transmit the semi-structured dataset comprising one or more entities to the application server 104 for facilitating the operation of the electronic device, via the communication network 106.

A person with ordinary skills in the art will understand that the scope of the disclosure is not limited to the database server 102 as a separate entity. In an embodiment, the functionalities of the database server 102 can be integrated into the application server 104, and vice versa.

In an embodiment, the application server 104 may refer to a computing device or a software framework hosting an application or a software service. In an embodiment, the application server 104 may be implemented to execute procedures such as, but not limited to, programs, routines, or scripts stored in one or more memories for supporting the hosted application or the software service. In an embodiment, the hosted application or the software service may be configured to perform one or more predetermined operations. The application server 104 may be realized through various types of application servers such as, but are not limited to, a Java application server, a .NET framework application server, a Base4 application server, a PHP framework application server, or any other application server framework.

In an embodiment, the application server 104 may be configured to receive a semi-structured dataset comprising one or more entities. In an embodiment, the semi-structured dataset corresponds to at least an indication of an operation problem associated with the electronic device. The application server 104 may be configured to extract one or more unique classes associated with one or more entities from the semi-structured dataset. The application server 104 may be configured to create one or more n-grams representative of a relationship between the one or more entities and the one or more unique classes. The application server 104 may be configured to determine a frequency of each of the one or more entities in the one or more n-grams based on a weight assigned to the one or more unique classes. The application server 104 may be configured to generate a hypothesis associated with the one or more entities based on a first set of entities from the one or more entities using the one or more n-grams. In an embodiment, the frequency associated with the first set of entities may be greater than a pre-defined threshold. In an embodiment, the generated hypothesis may correspond to an operation solution to solve the operation problem associated with the electronic device. The operation of the application server 104 has been discussed later in conjunction with FIG. 2.

A person having ordinary skill in the art will appreciate that the scope of the disclosure is not limited to realizing the application server 104 and the user-computing device 108 as separate entities. In an embodiment, the application server 104 may be realized as an application program installed on and/or running on the user-computing device 108 without departing from the scope of the disclosure.

In an embodiment, the communication network 106 may correspond to a communication medium through which the database server 102, the application server 104, and the user-computing device 108 may communicate with each other. Such a communication may be performed, in accordance with various wired and wireless communication protocols. Examples of such wired and wireless communication protocols include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, 2G, 3G, 4G cellular communication protocols, and/or Bluetooth (BT) communication protocols. The communication network 106 may include, but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

In an embodiment, the user-computing device 108 may refer to a computing device used by a user. The user-computing device 108 may comprise of one or more processors and one or more memories. The one or more memories may include computer readable code that may be executable by the one or more processors to perform pre-determined operations. In an embodiment, the user-computing device 108 may include hardware and/or software to receive the generated hypothesis. In an embodiment, the generated hypothesis may correspond to an operation solution to solve the operation problem associated with the electronic device. Examples of the user-computing device 108 may include, but are not limited to, a personal computer, a laptop, a personal digital assistant (PDA), a mobile device, a tablet, or any other computing device.

Figure 2:
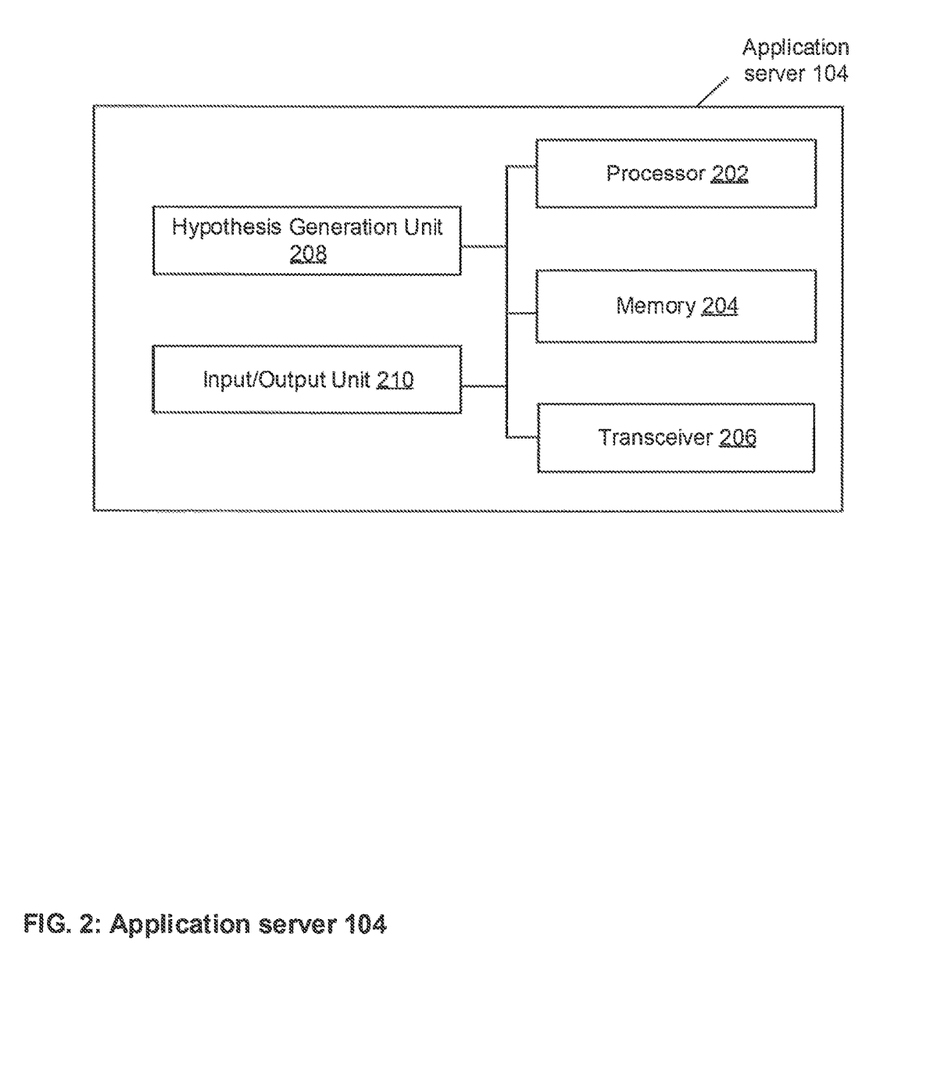
FIG. 2 is a block diagram that illustrates an application server configured to facilitate operation of an electronic device, in accordance with at least one embodiment.

FIG. 2 is a block diagram that illustrates an application, server 104 configured to facilitate operation of an electronic device, in accordance with at least one embodiment. FIG. 2 is explained in conjunction with elements from FIG. 1. In an embodiment, the application server 104 includes a processor 202, a memory 204, a transceiver 206, a hypothesis generation unit 208, and an input/output unit 210. The processor 202 may be communicatively coupled to the memory 204, the transceiver 206, the hypothesis generation unit 208, and the input/output unit 220. The transceiver 206 may be communicatively coupled to the communication network 106.

The processor 202 comprises suitable logic, circuitry, interfaces, and/or code that may be configured to execute a set of instructions stored in the memory 204. The processor 202 may be implemented based on a number of processor technologies known in the art. The processor 202 may work in coordination with the transceiver 206, the hypothesis generation unit 208, and the input/output unit 210 to facilitate the operation of the electronic device. Examples of the processor 202 include, but not limited to, an X86-based processor, a Reduced Instruction Set Computing (RISC) processor, an Application-Specific Integrated Circuit (ASIC) processor, a Complex Instruction Set Computing (CISC) processor, and/or other processor.

The memory 204 comprises suitable logic, circuitry, interfaces, and/or code that may be configured to store the set of instructions, which are executed by the processor 202. In an embodiment, the memory 204 may be configured to store one or more programs, routines, or scripts that may be executed in coordination with the processor 202. The memory 204 may be implemented based on a Random Access Memory (RAM), a Read-Only Memory (ROM), a Hard Disk Drive (HDD), a storage server, and/or a Secure Digital (SD) card.

The transceiver 206 comprises of suitable logic, circuitry, interfaces, and/or code that may be configured to receive the semi-structured dataset from the database server 102, via the communication network 106. The transceiver 206 may be further configured to transmit the generated hypothesis to the user-computing device 108, via the communication network 106. The transceiver 206 may implement one or more known technologies to support wired or wireless communication with the communication network 106. In an embodiment, the transceiver 206 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 206 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), WI-MAX, a protocol for email, instant messaging, and/or Short Message Service (SMS).

The hypothesis generation unit 208 comprises suitable logic, circuitry, interfaces, and/or code that may be configured to extract one or more unique classes associated with one or more entities from the semi-structured dataset. The hypothesis generation unit 208 may be configured to create one or more n-grams representative of a relationship between the one or more entities and the one or more unique classes. The hypothesis generation unit 208 may be configured to determine a frequency of each of the one or more entities in the one or more n-grams. In an embodiment, a weight may be assigned to each of the one or more unique classes by the hypothesis generation unit 208. The hypothesis generation unit 208 may be configured to generate a hypothesis associated with the one or more entities based on a first set of entities from the one or more entities using the one or more n-grams. In an embodiment, the generated hypothesis may correspond to an operation solution to solve the operation problem associated with the electronic device.

The input/output unit 210 comprises suitable logic, circuitry, interfaces, and/or code that may be configured to receive an input or transmit an output to the user-computing device 108. The input/output unit 210 comprises of various input and output devices that are configured to communicate with the processor 202. Examples of the input devices include, but are not limited to, a keyboard, a mouse, a joystick, a touch screen, a microphone, a camera, and/or a docking station. Examples of the output devices include, but are not limited to, a display screen and/or a speaker.

In operation, processor 202 works in coordination with the hypothesis generation unit 208 to facilitate the operation of the electronic device. In an exemplary implementation, the user-computing device 108 may be configured to transmit a request to the application server 104. In an embodiment, the request may correspond to determining an operation solution to solve the operation problem associated with an electronic device. For example, the request may be "Unable to configure printer". Thus, the electronic device corresponds to the printer and the operation problem corresponds to "Unable to configure". In response to the received request, the application server 104 may request the database server 102 to transmit the semi structured dataset. The database server 102 may be configured to transmit the semi-structured dataset to the application server 104 via the communication network 106. The application server may be configured to receive the semi-structured dataset comprising one or more entities. In an embodiment, the semi-structured dataset may correspond to at least an indication of an operation problem associated with the electronic device. In an embodiment, the semi-structured dataset may correspond to a SQL database.

After receiving the semi-structured dataset, the processor 202 may be configured to perform one or more preprocessing operations on the semi-structured dataset. In an embodiment, the preprocessing operation may comprises at least one of stop word removal, stemming, data curation, Part of Speech (PoS) tagging, synonym/hyponym/hypernym based data enhancement, and the like.

For example, the semi-structured dataset on which the one or more preprocessing operations may be performed is illustrated as shown in table 1 below. The one or more entities may correspond to the values in the table 1 illustrated below.

TABLE 1

| Asset | Subarea | Vendor | Description |
|---|---|---|---|
| PRINTER | CONFIGURE | CANON | printer not working |
| PC | AUTHENTICATION | HP | shashank pc not starting and resolved |
| DESKTOP | CONFIGURE | DELL | supervisor mrlulu fernandes - encountering issues laptop keyboard keys not working requesting priority |
| LAPTOP | SLOW | HCL | system not booting |
| E-MAIL | LOGIN | WIPRO | configure e-mail basis |
| PC | INSTALLATION | ZENITH | upgrade ram |
| SCANNER | NETWORK | TOSHIBA | scanner not working |

After performing the one or more preprocessing operations on the semi-structured data represented in table 1, the output may be represented as shown in table 2 below.

TABLE 2

| Asset | Subarea | Vendor | Description |
|---|---|---|---|
| PRINTER | CONFIGURE | CANON | printer not work |
| PC | AUTHENTICATION | HP | shashank pc not start resolved |
| DESKTOP | CONFIGURE | DELL | supervisor mrlulu fernandes - encounter issues laptop keyboard keys not work request priority |
| LAPTOP | SLOW | HCL | system not boot |
| E-MAIL | LOGIN | WIPRO | configure e-mail basis |
| PC | INSTALLATION | ZENITH | upgrade ram |
| SCANNER | NETWORK | TOSHIBA | scanner not work |

After generating the output as represented in table 2, the hypothesis generation unit 208 may be configured to extract one or more unique classes associated with one or more entities from the semi-structured dataset. For extracting the one or more unique classes, the hypothesis generation unit 208 may be configured to determine one or more dependent variables and one or more independent variables from the semi-structured dataset. The hypothesis generation unit 208 may apply a filter on specific column(s) and select individual values under specific column. As a result of application of the filter, unique values for each entity may be determined.

In an embodiment, such filter may be applied on each of the columns in the semi-structured dataset to determine the one or more dependent variables and one or more independent variables from the semi-structured dataset. Based on the determined one or more dependent variables and one or more independent variables from the semi-structured dataset, the hypothesis generation unit 208 may be configured to extract the one or more unique classes associated with one or more entities from the semi-structured dataset. For example, the one or more unique classes extracted from the table 2 may comprise Asset, Subarea and Vendor and PRINTER, CONFIGURE, DELL may correspond to the one or more entities associated with each of the one or more unique classes, respectively. For example, if the operation problem is described as "PRINTER CONFIGURE CANON" in the semi-structured dataset. Thus, the 'PRINTER' corresponds to the asset class, 'CONFIGURE' corresponds to subarea and 'CANON' corresponds to vendor. An illustrative example of the extracted one or more unique classes is represented in table 3 below.

TABLE 3

| | One or more unique classes | | |
|---|---|---|---|
| | Asset | Subarea | Vendor |
| One or more entities | PC | PROBLEMS | CANON |
| | E-MAIL | CONFIGURE | HCL |
| | SCANNER | SLOW | TOSHIBA |
| | LAPTOP | CONNECT | ZENITH |
| | OUTLOOK | LOGIN | HP |
| | OFFICE | AUTHENTICATION | ACER |
| | HARDWARE | INSTALLATION | IBM |
| | INFRASTRUCTURE | NETWORK | KODAK |
| | SERVERS | TRANSFER | XEROX |
| | USB | UPGRADE | WIPRO |
| | BATTERY | SETUP | ACMA |
| | LCD | DEPLOYMENT | COMPAQ |
| | Wi-fi | REPLACE | FUJITSU |
| | PRINTER | EXCEPTION | MUSTEK |
| | | LOGOUT | PHILIPS |
| | | CANCEL | LG |
| | | | EPSON |

Based on the extracted one or more unique classes, the hypothesis generation unit 208 may be configured to annotate an unstructured part of the semi-structured dataset. In an embodiment, the unstructured part may correspond to the description of the operation problem associated with the electronic device, Below are the examples of annotation performed based on the extracted one or more unique classes.

- outlook (Asset) is not working properly it take lot of time in starting and also it will show trying to connect (Subarea) most of the time even if it's get connected after sometime it will disconnect and reconnect after long time
- Please assign this ticket to Chennai cdc5 S3 laptop (Asset) walking center As discussed please help me to change my laptop (Asset) hard disk
- Need to replace (Subarea) the laptop (Asset) battery (Asset)
- Unable to update windows patches in my new Laptop (Asset) Dell (Vendor) E7240 with Windows 8

After annotation, the hypothesis generation unit 208 may be configured to create one or more n-grams representative of a relationship between the one or more entities and the one or more unique classes. In an embodiment, the n-gram may correspond to a 2-gram, or 3-gram, Table 4 and table 5 shown below are illustrative examples of the 2-gram and the 3-gram that represent the relationship between the one or more entities and the one or more unique classes.

TABLE 4

| 2-gram | |
|---|---|
| PRINTER | CONNECT |
| PRINTER | PROBLEMS |
| PRINTER | CONFIGURE |
| PRINTER | SLOW |
| PC | INSTALLATION |
| PC | PROBLEMS |
| PC | CONFIGURE |

TABLE 5

| 3-gram | | |
|---|---|---|
| PRINTER | INSTALLATION | DELL |
| PRINTER | INSTALLATION | CANON |
| PRINTER | INSTALLATION | HCL |
| PRINTER | INSTALLATION | TOSHIBA |
| PRINTER | INSTALLATION | ZENITH |
| PRINTER | PROBLEMS | DELL |
| PRINTER | PROBLEMS | CANON |
| PRINTER | PROBLEMS | HCL |
| PRINTER | PROBLEMS | TOSHIBA |
| PRINTER | PROBLEMS | ZENITH |
| PC | INSTALLATION | DELL |
| PC | INSTALLATION | CANON |
| PC | INSTALLATION | HCL |
| PC | INSTALLATION | TOSHIBA |
| PC | INSTALLATION | ZENITH |

After creating the one or more n-grams, the hypothesis generation unit 208 may be configured to assign weights to each of the one or more entities using one or more known in the art techniques based on the determined frequency. Table 6 shown below is an illustrative example of the assigned weights.

TABLE 6

| Entity | Weight |
|---|---|
| PC | 10 |
| PRINTER | 10 |
| E-MAIL | 9 |
| SCANNER | 10 |
| LAPTOP | 10 |
| OUTLOOK | 8 |
| OFFICE | 7 |
| HARDWARE | 5 |
| INFRASTRUCTURE | 5 |
| SERVERS | 6 |
| USB | 4 |
| BATTERY | 4 |
| LCD | 5 |
| Wi-fi | 7 |
| PROBLEMS | 5 |
| CONFIGURE | 10 |
| SLOW | 5 |
| CONNECT | 10 |
| LOGIN | 10 |
| AUTHENTICATION | 10 |
| INSTALLATION | 9 |
| NETWORK | 9 |
| TRANSFER | 6 |
| UPGRADE | 7 |
| SETUP | 8 |
| DEPLOYMENT | 5 |
| REPLACE | 6 |
| EXCEPTION | 7 |
| LOGOUT | 7 |
| CANCEL | 6 |

TABLE 6-continued

| Entity | Weight |
| --- | --- |
| CANON | 10 |
| HCL | 10 |
| TOSHIBA | 10 |
| ZENITH | 10 |
| HP | 10 |
| ACER | 10 |
| IBM | 10 |
| KODAK | 10 |
| XEROX | 10 |
| WIPRO | 10 |
| ACMA | 10 |
| COMPAQ | 10 |
| FUJITSU | 10 |
| MUSTEK | 10 |
| PHILIPS | 10 |
| LG | 10 |
| EPSON | 10 |

The hypothesis generation unit 208 may be configured to determine a frequency of each of the one or more entities in the one or more n-grams. In an embodiment, hypothesis generation unit 208 may be configured to rank the one or more entities based on the determined frequency. After determining the frequency, the hypothesis generation unit 208 may be configured to determine a cumulative weight associated with each of the one or more entities in the one or more n-grams. Table 7 and table 8 shown below are an illustrative example of the determined frequencies of each of the one or more entities in the one or more n-grams and the determined cumulative weight.

For 2-gram

TABLE 7

| One or more entities | | Frequency | cumulative weight |
| --- | --- | --- | --- |
| PRINTER | INSTALLATION | 11 | 209(11 * 10 + 11 * 9) |
| PC | CONFIGURE | 9 | 180(9 * 10 + 9 * 10) |
| LAPTOP | CONFIGURE | 8 | 160(8 * 10 + 8 * 10) |
| PRINTER | CONFIGURE | 5 | 100(5 * 10 + 5 * 10) |
| OUTLOOK | LOGIN | 4 | 72(4 * 8 + 4 * 10) |

For 3-gram

TABLE 8

| One or more entities | | | Frequency | cumulative weight |
| --- | --- | --- | --- | --- |
| PRINTER | INSTALLATION | HCL | 7 | 203(7 * 10 + 7 * 9 + 7 * 10) |
| PRINTER | CONFIGURE | TOSHIBA | 5 | 150(5 * 10 + 5 * 10 + 5 * 10) |
| PC | INSTALLATION | DELL | 4 | 116(4 * 10 + 4 * 9 + 4 * 10) |
| PC | LOGIN | WIPRO | 3 | 90(3 * 10 + 3 * 10 + 3 * 10) |
| PRINTER | PROBLEMS | ZENITH | 2 | 50(2 * 10 + 2 * 5 + 2 * 10) |

After determining the cumulative weight, the hypothesis generation unit 208 may be configured to generate a hypothesis associated with the one or more entities based on a first set of entities from the one or more entities using the one or more n-grams. In an embodiment, the frequency associated with the first set of entities is greater than a pre-defined threshold. For example, the pre-defined threshold of the frequency may be configured at entity level, weightage and various hypothesis can be generated. Further, the cumulative weight may be utilized by the hypothesis generation unit 208 to generate the hypothesis. In an embodiment, the generated hypothesis may correspond to an operation solution to solve the operation problem associated with the electronic device.

For example, based on the table 8, the generated hypothesis may be represented as below:

Generated Hypothesis:
  HCL PRINTER having more INSTALLATION issue Occur 33.33%
  TOSHIBA PRINTER having more CONFIGURE issue Occur 24.63%
  DELL PC having INSTALLATION issue Occur 19.04%
  WIPRO PC having LOGIN issue Occur 14.77%
  ZENITH PRINTER having PROBLEMS Occur 8.21%

After generating the hypothesis, the hypothesis generation unit 208 may be configured to validate the generated hypothesis by using one or more natural language models on a test dataset (received from the database server 102) to generate a description of the generated hypothesis. The generated hypothesis along with the description of the generated hypothesis may be transmitted by the transceiver 206 to the user-computing device 108. In accordance with the received hypothesis and the corresponding description, the user of the user-computing device 108 may utilize the operation solution to solve the operation problem associated with the electronic device.

Figure 3:
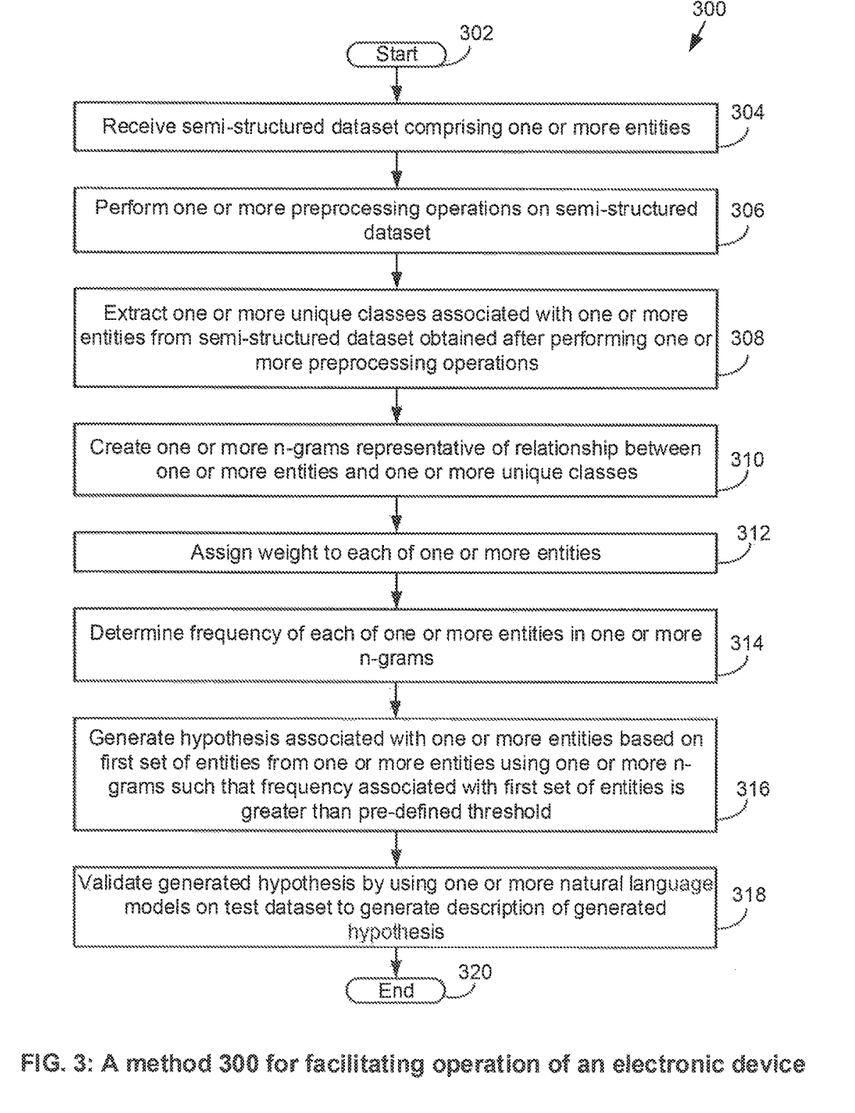
FIG. 3 is a flowchart that illustrates a method for facilitating operation of an electronic device, in accordance with at least one embodiment.

FIG. 3 is a flowchart 300 that illustrates a method for facilitating the operation of the electronic device, in accordance with at least one embodiment. The flowchart 300 is described in conjunction with FIG. 1 and FIG. 2. The method starts at step 302.

At step 304, the application server 104 may be configured to receive the semi-structured dataset comprising one or more entities. In an embodiment, the semi-structured dataset corresponds to at least an indication of an operation problem associated with the electronic device. At step 306, the application server 104 may be configured to perform one or more preprocessing operations on the semi-structured dataset, wherein the preprocessing operation comprises at least one of stop word removal, stemming, data curation, Part of Speech (PoS) tagging, synonym/hyponym/hypernym based data enhancement. At step 308, the application server 104 may be configured to extract one or more unique classes associated with one or more entities from the semi-structured dataset obtained after performing the one or more preprocessing operations.

At step 310, the application server 104 may be configured to create one or more n-grams representative of a relationship between the one or more entities and the one or more unique classes. At step 312, the application server 104 may be configured to assign a weight to each of the one or more entities. At step 314, the application server 104 may be configured to determine a frequency of each of the one or more entities in the one or more n-grams. At step 316, the application server 104 may be configured to generate a hypothesis associated with the one or more entities based on a first set of entities from the one or more entities using the one or more n-grams such that the frequency associated with the first set of entities is greater than a pre-defined threshold. At step 318, the application server 104 may be configured to validate the generated hypothesis by using one or more natural language models on a test dataset to generate a description of the generated hypothesis. Control passes to end step 320.

Computer System

Figure 4:
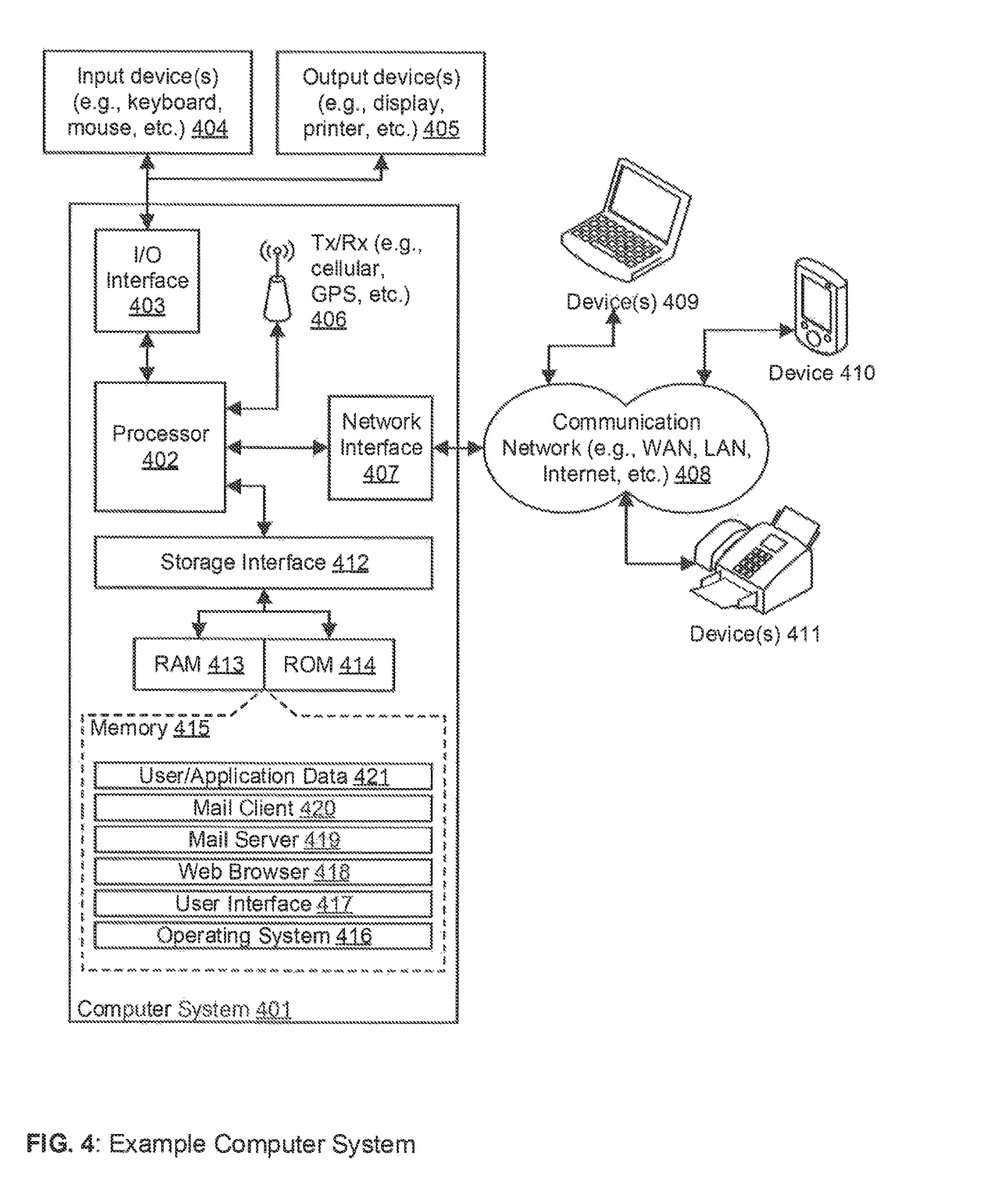
FIG. 4 is a block diagram of an exemplary computer system for implementing embodiments consistent with the present disclosure.

FIG. 4 is a block diagram of an exemplary computer system for implementing embodiments consistent with the present disclosure. Variations of computer system 401 may be used for achieving improved rate distortion performance by using the distributed video encoding apparatus 102 and the distributed video decoding apparatus 118. Computer system 401 may comprise a central processing unit ("CPU" or "processor") 402. Processor 402 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures, Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), W Max, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 410, 411, and 412. These devices may include, without limitation, personal computer(s), server(s), fax machines, printers, scanners, various mobile devices such as cellular telephones, smartphones (e.g. Apple iPhone, Blackberry, Android-based phones, etc,), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, strollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet it server such as Microsoft Exchange, or the like. The mail server may utilize facilities such as ASP, ActiveX, ANSI C++/C#, Microsoft .NET, CGI scripts, Java JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

Various embodiments of the disclosure provide a non-transitory computer readable medium and/or storage medium, and/or a non-transitory machine-readable medium and/or storage medium having stored thereon, a machine code and/or a computer program having at least one code section executable by a machine and/or a computer to segment the multimedia content. The at least one code section in an multimedia content server 104 causes the machine and/or computer comprising one or more processors to perform the steps, which comprises receiving a semi-structured dataset comprising one or more entities, wherein the semi structured dataset corresponds to at least an indication of an operation problem associated with an electronic device. The one or more processors may be configured to extract one or more unique classes associated with one or more entities from the semi-structured dataset. The one or more processors may be configured to create one or more n-grams representative of a relationship between the one or more entities and the one or more unique classes. The one or more processors may be configured to determine a frequency of each of the one or more entities in the one or more n-grams, wherein a weight is assigned to each of the one or more unique classes. The one or more processors may be configured to generate a hypothesis associated with the one or more entities based on a first set of entities from the one or more entities using the one or more n-grams, wherein the frequency associated with the first set of entities is greater than a pre-defined threshold, wherein the generated hypothesis corresponds to an operation solution to solve the operation problem associated with the electronic device.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method for facilitating operation of an electronic device, the method comprising:

receiving, by an application server, a semi-structured dataset comprising one or more entities, wherein the semi structured dataset corresponds to at least an indication of an operation problem associated with the electronic device;

extracting, by the application server, one or more unique classes associated with one or more entities from the semi-structured dataset;

creating, by the application server, one or more n-grams representative of a relationship between the one or more entities and the one or more unique classes;

determining, by the application server, a frequency of each of the one or more entities in the one or more n-grams, wherein a weight is assigned to each of the one or more unique classes;

generating, by the application server, a hypothesis associated with the one or more entities based on a first set of entities from the one or more entities using the one or more n-grams, wherein the frequency associated with the first set of entities is greater than a pre-defined threshold, wherein the generated hypothesis corresponds to an operation solution to solve the operation problem associated with the electronic device; and validating, by the application server, the generated hypothesis by using one or more natural language models on a test dataset to generate a description of the generated hypothesis.

2. The method of claim 1, wherein the semi-structured dataset corresponds to a SQL database.

3. The method of claim 1, further comprising performing, by the application server, one or more preprocessing operations on the semi-structured dataset, wherein the preprocessing operation comprises at least one of stop word removal, stemming, data curation, Part of Speech (PoS) tagging, synonym/hyponym/hypernym based data enhancement.

4. The method of claim 1, further comprising annotating, by the application server, an unstructured part of the semi-structured dataset based on at least one of the one or more unique classes.

5. The method of claim 1, further comprising ranking, by the application server, the one or more entities based on the determined frequency.

6. The method of claim 1, further comprising determining, by the application server, one or more dependent variables and one or more independent variables from the semi structured dataset.

7. An application server to facilitate operation of an electronic device, the application server comprising:
one or more processors configured to:
receive a semi-structured dataset comprising one or more entities, wherein the semi-structured dataset corresponds to at least an indication of an operation problem associated with the electronic device;
extract one or more unique classes associated with one or more entities from the semi-structured dataset;
create one or more n-grams representative of a relationship between the one or more entities and the one or more unique classes;
determine a frequency of each of the one or more entities in the one or more n-grams, wherein a weight is assigned to each of the one or more unique classes;
generate a hypothesis associated with the one or more entities based on a first set of entities from the one or more entities using the one or more n-grams, wherein the frequency associated with the first set of entities is greater than a pre-defined threshold, wherein the generated hypothesis corresponds to an operation solution to solve the operation problem associated with the electronic device; and
validate the generated hypothesis by using one or more natural language models on a test dataset to generate a description of the generated hypothesis.

8. The application server of claim 7, wherein the semi-structured dataset corresponds to a SQL database.

9. The application server of claim 7, wherein the one or more processors are further configured to perform one or more preprocessing operations on the semi-structured dataset, wherein the preprocessing operation comprises at least one of stop word removal, stemming, data curation, Part of Speech (PoS) tagging, synonym/hyponym/hypernym based data enhancement.

10. The application server of claim 7, wherein the one or more processors are further configured to annotate an unstructured part of the semi-structured dataset based on at least one of the one or more unique classes.

11. The application server of claim 7, wherein the one or more processors are further configured to rank the one or more entities based on the determined frequency.

12. The application server of claim 7, wherein the one or more processors are further configured to determine one or more dependent variables and one or more independent variables from the semi structured dataset.

13. A non-transitory computer-readable storage medium having stored thereon, a set of computer-executable instructions for causing a computer comprising one or more processors to perform steps comprising:
receiving a semi-structured dataset comprising one or more entities, wherein the semi-structured dataset corresponds to at least an indication of an operation problem associated with an electronic device;
extracting one or more unique classes associated with one or more entities from the semi-structured dataset;
creating one or more n-grams representative of a relationship between the one or more entities and the one or more unique classes;
determining a frequency of each of the one or more entities in the one or more n-grams, wherein a weight is assigned to each of the one or more unique classes;
generating a hypothesis associated with the one or more entities based on a first set of entities from the one or more entities using the one or more n-grams, wherein the frequency associated with the first set of entities is greater than a pre-defined threshold, wherein the generated hypothesis corresponds to an operation solution to solve the operation problem associated with the electronic device; and
validating the generated hypothesis by using one or more natural language models on a test dataset to generate a description of the generated hypothesis.

* * * * *